(12) United States Patent
Okochi et al.

(10) Patent No.: US 6,627,352 B1
(45) Date of Patent: Sep. 30, 2003

(54) LITHIUM ION SECONDARY BATTERY AND ITS NEGATIVE ELECTRODE

(75) Inventors: Masaya Okochi, Osaka (JP); Masaki Kitagawa, Katano (JP); Takashi Takeuchi, Kadoma (JP); Hajime Nishino, Neyagawa (JP); Hizuru Koshina, Neyagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 380 days.

(21) Appl. No.: 09/051,933
(22) PCT Filed: Aug. 8, 1997
(86) PCT No.: PCT/JP97/02778
§ 371 (c)(1), (2), (4) Date: Apr. 22, 1998
(87) PCT Pub. No.: WO98/08263
PCT Pub. Date: Feb. 26, 1998

(30) Foreign Application Priority Data

Aug. 22, 1996 (JP) .............................. 8-220914

(51) Int. Cl.⁷ .................................................. H01M 4/58
(52) U.S. Cl. ................................................. 429/231.8
(58) Field of Search .................... 429/231.8, 231.1, 429/231.4

(56) References Cited

U.S. PATENT DOCUMENTS

| | | | | |
|---|---|---|---|---|
| 4,157,317 A | * | 6/1979 | Nagasawa et al. | 252/511 |
| 5,340,670 A | * | 8/1994 | Takami et al. | 429/331 |
| 5,521,027 A | * | 5/1996 | Okuno et al. | 429/332 |
| 5,658,691 A | * | 8/1997 | Suzuki et al. | 429/231.8 |

FOREIGN PATENT DOCUMENTS

| | | |
|---|---|---|
| EP | 656668 | 6/1995 |
| GB | 2299702 | 10/1996 |
| JP | 62-136011 | 6/1987 |
| JP | 4-206479 | 7/1992 |
| JP | 5-74493 | 3/1993 |
| JP | 5-139712 | 6/1993 |
| JP | 06119925 | 4/1994 |
| JP | 6-132032 | 5/1994 |
| JP | 6-168724 | 6/1994 |
| JP | 6-275321 | 9/1994 |
| JP | 6-290774 | 10/1994 |
| JP | 7-105935 | 4/1995 |
| JP | 7-161347 | 6/1995 |
| JP | 7-161389 | 6/1995 |
| JP | 8-180871 | 7/1996 |
| JP | 8-306354 | 11/1996 |

OTHER PUBLICATIONS

Fishbane, Paul M., et al. Physics for Scientists and Engineers, Prentice Hall, Inc., pp. 793–796, 1993.*

International Search Report corresponding to publication No. WO98/08263 dated Feb. 26, 1998, (w/translation).

* cited by examiner

*Primary Examiner*—Randy Gulakowski
*Assistant Examiner*—Jonathan Crepeau
(74) *Attorney, Agent, or Firm*—RatnerPrestia

(57) ABSTRACT

The present invention relates to a lithium ion secondary battery using as the negative active material thereof a carbon material that enables the absorption and release of lithium ions and has volume resistivity not exceeding $5.0 \times 10^{-3}$ ohmcm, thereby preventing battery temperatures from increasing abruptly due to low volume resistivity of the carbon material even when short-circuiting takes place inside of the battery.

12 Claims, 1 Drawing Sheet

LITHIUM ION SECONDARY BATTERY AND ITS NEGATIVE ELECTRODE

THIS APPLICATION IS A U.S. NATIONAL PHASE APPLICATION OF PCT INTERNATIONAL APPLICATION PCT/JP97/02778.

FIELD OF THE INVENTION

The present invention relates to a lithium ion secondary battery and a carbon material for the negative electrode used in the lithium ion secondary battery.

BACKGROUND OF THE INVENTION

As many more types of electronic equipment are being produced in portable versions and cordless versions in recent years, demands for secondary batteries, each having a small size, a light weight and a high energy density and serving as a power supply for the foregoing electronic equipment have been increasing.

In this regard, a nonaqueous electrolyte secondary battery, particularly a lithium ion secondary battery, has great expectations as a battery having a high voltage high energy density.

So far, a battery family employing transition metal oxides or sulfides such as manganese dioxides, molybdenum disulfides and the like to serve as a positive electrode and metallic lithium or alloys of lithium as a negative electrode has been put forth to produce lithium ion secondary batteries.

However, when metallic lithium is used as the negative electrode, the metallic lithium is deposited on the negative electrode in a needle-like shape or a moss-like configuration during a charge, piercing through separators and coming into contact with the positive electrode, thereby causing serious problems in safety of the battery such as a sudden rise in battery temperatures and the like due to internal short-circuiting.

As a result, use of a carbon material that can absorb and release lithium ions as the negative electrode has been proposed. In this case, lithium ions get into the carbon material between the layers thereof and no lithium is deposited on the negative electrode, thus eliminating the dangers of degrading the safety of the battery and at the same time contributing to an improvement in rapid charge characteristics. Because of these reasons, lots of R&D activities are being carried out at present in this particular area.

In these cases, a lithium-containing metal oxide such as $LiCoO_2$, $LiNiO_2$ or the like is used as the material for negative electrodes.

When such an accident as a battery being pressed strongly from both side surfaces occurs, however, the external pressure applied to the side surfaces of the battery used to cause the positive and negative electrodes to contact with each other after breaking through separators, resulting in development of an internal short circuit.

Upon developing the internal short circuit as described in the above, large currents flowing through the areas where the positive and negative electrodes are in contact with each other bring about a heat generation caused by Joule's heat due to large contact resistance, thereby raising a problem of an abrupt increase in battery temperatures.

DISCLOSURE OF THE INVENTION

The present invention deals with the problem as described in the above and has an objective of providing much safer types of lithium ion secondary batteries, temperatures of which do not increase abruptly even if the batteries are crushed.

In order to accomplish this objective, the present invention has proposed a negative electrode for lithium ion secondary batteries that uses a material containing a carbon material of less than $5.0 \times 10^{-3}$ ohmcm in volume resistivity, whereby absorption and release of lithium ions are made possible. Therefore, even when the batteries are crushed and internal short-circuiting takes place, generation of Joule's heat is suppressed due to small volume resistance of carbon material.

Further, the present invention has disclosed a lithium ion secondary battery using a lithium-containing transition metal composite oxide as the positive electrode thereof and also using as the negative electrode thereof a carbon material that can absorb and release lithium ions and wherein volume resistivity is made less than $5.0 \times 10^{-3}$ ohmcm.

Furthermore, the present invention has disclosed use of a negative electrode wherein filling density of a carbon material ranges from 1.2 to 2.0 g/cc.

PREFERRED EMBODIMENTS OF THE INVENTION

Figure 1:
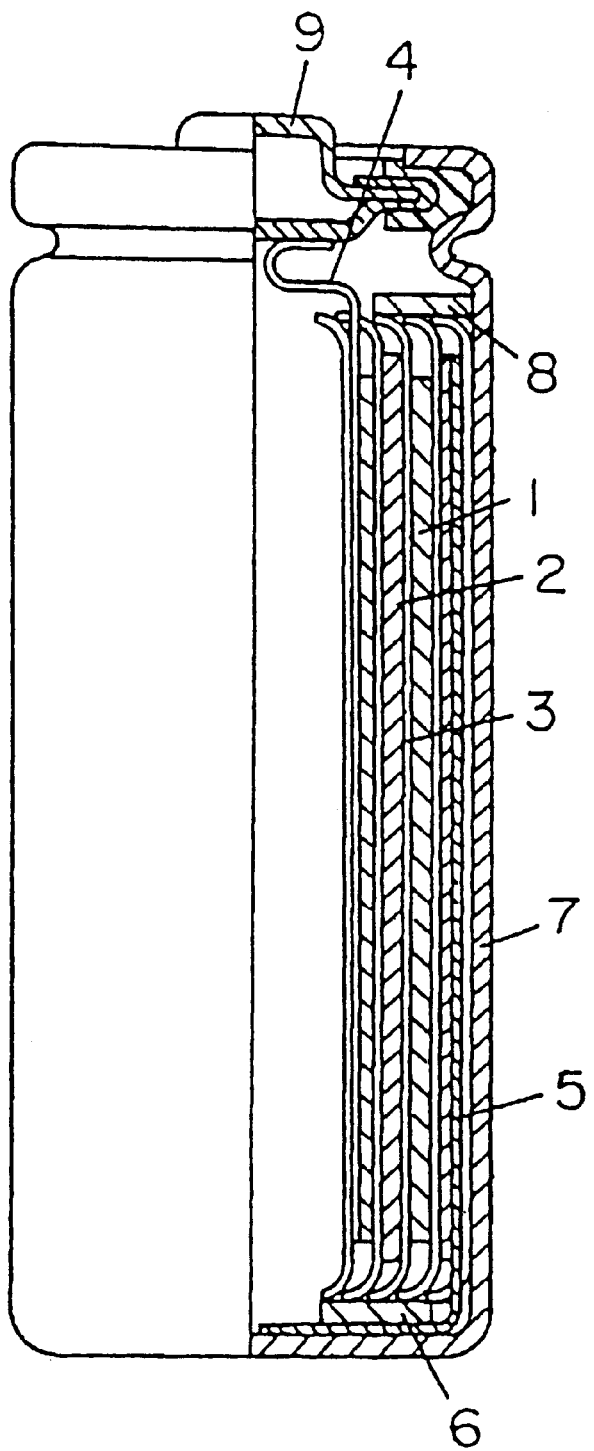
FIG. 1 is a cross-sectional view of a lithium ion secondary battery in an exemplary embodiment of the present invention.

Next, an explanation will be made on a lithium ion secondary battery in an exemplary embodiment of the present invention, which contains a group of electrodes formed by winding a positive electrode and negative electrode together with a separator.

According to the present invention, it is preferred that volume resistivity of carbon material is made smaller than $5.0 \times 10^{-3}$ ohmcm because larger resistance of the carbon material than the above brings about generation of large Joule's heat, when the battery is crushed, the separator is broken and the positive electrode and negative electrode come into contact with each other, large electric currents concentrate into contact points, thereby causing sometime the battery temperatures to rise locally and abruptly.

The volume resistivity of an electrode that uses a carbon material changes according to the filling density of carbon per unit volume of the electrode.

Since the energy density of a battery is determined by how much of electrode materials is packed in a limited volume available inside a battery container, it is advantageous to have the most possible filling density. With a large filling density, volume resistivity tends to decrease resulting in a favorable performance of the battery but when the filling density exceeds a certain limit the electrodes become less porous and infiltration of electrolyte into the electrodes becomes more difficult with a resulting increase in mobility resistance and deterioration in battery's high rate characteristics.

Therefore, it is preferred that the filling density of carbon per negative electrode volume is made less than 2.0 g/cc. On the other hand, when the filling density is too small, the volume resistivity increases and at the same time the battery capacity is reduced. Therefore, it is preferred that the filling density is made more than 1.2 g/cc.

The nonaqueous electrolyte used in a lithium ion secondary battery of the present invention is prepared by dissolving an electrolyte in a nonaqueous solvent.

As the nonaqueous solvent, an organic solvent generally employed in a lithium ion secondary battery can be used singularly or as a combination of several kinds thereof.

For example, such cyclic carbonates as ethylene carbonate (EC), propylene carbonate (PC), buthylene carbonate (BC) and the like, such chain carbonates as dimethyl carbonate (DMC), diethyl carbonate (DEC), ethylmethyl carbonate (EMC) and the like and such aliphatic carboxylic acids such as methyl propionate, ethyl propionate and the like are preferred.

Particularly, mixtures of cyclic carbonates and chain carbonates or mixtures of cyclic carbonates, chain carbonates and aliphatic carboxylic acid esters are more preferred.

As the electrolyte, for example, such lithium salts as lithium/ perchlorate ($LiClO_4$), lithium hexafluorophosphate ($LiPF_6$), lithium fluoroborate ($LiBF_4$), lithium arsenic hexafluoride ($LiAsF_6$), lithium trifluorosulforate ($LiCF_3SO_3$), bis(trifluoromethyl)sulfonylimido lithium [$LiN(CF_3SO_2)_2$] and the like can be used in isolation from others or in combination with some of others.

Particularly, use of lithium hexafluorophosphate ($LiPF_6$) is preferred.

The amount of electrolyte dissolution in nonaqueous solvent ranges from 0.2 mol/l to 2 mol/l and the amount of 0.5 mol/l to 1.5 mol/l is particularly preferred.

As the positive electrode active substance employed in a lithium ion secondary battery of the present invention, a variety of lithium-containing transition metal oxides (lithium manganese double oxides such as $LiMn_2O_4$ and the like, lithium-containing nickel oxides such as $LiNiO_2$ and the like and lithium-containing cobalt oxides such as $LiCoO_2$, and the foregoing oxides wherein part of manganese, nickel and cobalt is replaced with other transition metals and the like or a lithium-containing vanadium oxide and the like) and chalcogen compounds (such as manganese dioxide, titanium disulfide, molybdenum disulfide and the like) can be used. Particularly, use of lithium-containing transition metal oxides is preferred.

As the conductive material for positive electrode, artificial graphite, carbon black (such as acetylene black and the like) or nickel powder and the like can be used.

Further, as the carbon material employed in a lithium ion secondary battery of the present invention for absorbing or releasing lithium ions, what is obtained by sintering organic polymer compounds (such as phenol resin, polyacrylonitrile, cellulose and the like), or what is obtained by sintering coke and pitch or graphite that includes artificial graphite and natural-graphite-can be used. Particularly, use of graphite materials that include what is obtained by applying high-temperature processing to meso-phase spherical particles obtained by sintering meso-phase pitch, artificial graphite, natural graphite and the like is preferred.

Next, an explanation will be made on some of the exemplary embodiments of the present invention with reference to drawings.

FIG. 1 shows the structure of a cylindrical battery that has been prototyped to show the effectiveness of the exemplified embodiments of the present invention.

This prototyped battery measures 20 mm in diameter and 70 mm in total height.

EXEMPLARY EMBODIMENT 1

A positive electrode 1 in FIG. 1 is prepared by first applying a paste-like mixture, which comprises lithium cobalt oxide ($LiCoO_2$) serving as the active material and produced by sintering a mixture of lithium carbonate ($Li_2CO_3$) and 4,3-cobalt oxide ($Co_3O_4$) at 900° C. in the air, having then acetylene black mixed thereto by 3 weight % to make a conductive agent and finally having an aqueous dispersion system of polytetrafluoroethylene resin blended therewith by 7 weight % to serve as a binder, to both surfaces of a core material formed of aluminum foil and then, after drying and rolling, by cutting out to a dimension of 57 mm wide and 520 mm long. A positive electrode lead tab 4 is spot-welded to the end of the positive electrode 1.

A negative electrode 2 is prepared by applying a paste-like mixture, which comprises artificial graphite (average particle size of 25 μm in diameter) as an active material with styrene-butadiene-rubber serving as a binder blended with the active material by 5 weight % and then is completed by having the foregoing mixture kept in suspension in an aqueous solution of carboxymethylcellulose, to both surfaces of a core material formed of copper foil and then, after drying, by rolling to make the packing density of carbon equal to 1.4 g/cc and by cutting out to a dimension of 0.2 mm thick, 59 mm wide and 550 mm long.

A negative electrode lead tab 5 is spot-welded to the end of the negative electrode 2.

A separator 3 is a porous film formed of polypropylene resin and prepared by cutting to a dimension that is larger in width than the positive electrode 1 and negative electrode 2.

Next, the foregoing positive electrode 1 and negative electrode 2 are wound together with the separator 3 sandwiched in between so that the cross-sectional view of the wound body shows spiral patterns, thus completing a bundle of electrodes.

Then, a lower insulating ring 6 is placed on the bottom side of the electrode bundle, the whole of this is contained in a battery case 7 that measures 20 mm in diameter and 70 mm in height, and the negative electrode lead tab 7 is spot-welded to the battery case 7.

An upper insulating ring 8 is placed on the top side of the electrode bundle and a groove is formed on the surfaces of the battery case 7 in the upper part thereof, and then a nonaqueous electrolyte is filled in the battery case 7.

The electrolyte has been prepared by mixing ethylene carbonate (EC) and dimethyl carbonate (DMC) to 1:1 ratio in volume and then dissolving the foregoing mixture in lithium hexafluorophosphate ($LiPF_6$) of 1 mol/l.

The positive electrode lead tab 4 is spot-welded to a sealing plate assembly 9 which has a gasket built-in in advance and then the sealing plate assembly 9 is put together with the battery case 7, thus completing a battery A for the present exemplary embodiment.

EXEMPLARY EMBODIMENT 2

Another battery is prepared in the same way as was in Exemplary Embodiment 1 except for having used artificial graphite of 15 μm in average particle size as the negative electrode material, thus completing a battery B for Exemplary Embodiment 2.

EXEMPLARY EMBODIMENT 3

Still another battery is prepared in the same way as in Exemplary Embodiment 1 except for having made the density of the negative electrode material equal to 2.0 g/cc, thus completing a battery C for Exemplary Embodiment 3.

EXEMPLARY EMBODIMENT 4

Still another battery is prepared in the same way as in Exemplary Embodiment 1 except for having made the density of the negative electrode material equal to 1.2 g/cc, thus completing a battery D for Exemplary Embodiment 3.

COMPARISON EXAMPLE 1

A battery is prepared in the same way as was in Exemplary Embodiment 1 except for having used artificial graphite of 6 μm in average particle size as the negative electrode material, thus completing a battery E for use in Comparison Example 1.

COMPARISON EXAMPLE 2

Another battery is prepared in the same way as in Exemplary Embodiment 1 except for having used natural graphite of 20 μm in average particle size as the negative electrode material, thus completing a battery F for use in Comparison Example 1.

COMPARISON EXAMPLE 2.

Still another battery is prepared in the same way as in Exemplary Embodiment 1 except for having used natural graphite of 7 μm in average particle size as the negative electrode material, thus completing a battery G for use in Comparison Example 3.

COMPARISON EXAMPLE 4

Still another battery is prepared in the same way as in Exemplary Embodiment 1 except for having made the density of the negative electrode material equal to 2.1 g/cc, thus completing a battery H for Comparison Example 4.

COMPARISON EXAMPLE 5

Still another battery is prepared in the same way as in Exemplary Embodiment 1 except for having made the density of the negative electrode material equal to 1.0 g/cc. However, since the amount of carbon material is reduced to realize a smaller density of carbon material in the negative electrode, a sufficient initial capacity has not been gained.

Volume resistivity of each respective negative electrode material of the foregoing Exemplary Embodiments 1 to 4 and Comparison Examples 1 to 5 is measured by use of a four-terminal method with fine particle resistance measurement equipment (MCP-PD41 of Mitsubishi Chemical Co., Ltd.) and in accordance with JIS-K7194.

When resistance of fine particles is measured, the pressure applied to the fine particles has been adjusted so that each respective negative electrode material may realize the density as required of a corresponding negative electrode.

Prototyped batteries comprising 50 each of the batteries A, B, C and D of the present invention and 50 each of the batteries E, F, G and H as prepared for comparison examples are put on a constant voltage constant current charge under the conditions of a charge voltage of 4.2 V and a current limit of 800 mA at 20° C. for 2 hours, and then subjected to a battery crush test.

The battery crush test is conducted as follows:

Using a round rod of 6 mm in diameter in the shape of a cylindrical column, press the round rod on to the middle side of a battery to be tested in a direction perpendicular to the direction, in which the battery extends over the longest dimension, till the thickness of battery is reduced to one half of the original thickness.

High-rate characteristics of each respective battery are investigated by taking a ratio between the discharge capacity at a low current (200 mA) and the discharge capacity at a high current (2000 mA).

Table 1 shows the number of batteries that have ignited in the crush test, volume resistivity of negative electrode carbon material, density of negative electrode carbon material and capacity ratio between low current and high current for each respective test.

Table 1 tells that there is an explicit effect achieved by the battery of the present invention when the ignition rate of the batteries A, B, C and D in Exemplary Embodiments of the present invention is compared with that of the batteries E, F, G and H in Comparison Examples.

The batteries A, B, C and D using negative electrode carbon materials with volume resistivity of less than $5 \times 10^{-3}$ ohmcm have not shown any abrupt rise in battery temperatures even when the batteries are subjected to crush tests.

On the other hand, the battery H of Comparison Example 4 has shown no abrupt increase in temperatures but the high-rate characteristics thereof are found not good due to the fact that the density of the negative electrode carbon material exceeds 2.0, thus proving inappropriate for a practical use.

TABLE 1

| Battery Code | Number of batteries having ignited in crush tests | Volume resistivity of carbon material (ohmcm) | Density of carbon material (g/cc) | Capacity ratio |
|---|---|---|---|---|
| Battery A | 0/50 | $2.37 \times 10^{-3}$ | 1.40 | 0.95 |
| Battery B | 0/50 | $4.33 \times 10^{-3}$ | 1.40 | 0.98 |
| Battery C | 0/50 | $2.27 \times 10^{-3}$ | 2.00 | 0.90 |
| Battery D | 0/50 | $5.00 \times 10^{-3}$ | 1.20 | 0.95 |
| Battery E | 5/50 | $6.21 \times 10^{-3}$ | 1.40 | 0.95 |
| Battery F | 3/50 | $5.77 \times 10^{-3}$ | 1.40 | 0.90 |
| Battery G | 10/50 | $7.24 \times 10^{-3}$ | 1.40 | 0.92 |
| Battery H | 0/50 | $2.10 \times 10^{-3}$ | 2.20 | 0.40 |

Industrial Applicability

A lithium ion secondary battery of the present invention is produced using a carbon material with volume resistivity not exceeding $5.0 \times 10^{-3}$ ohmcm. Therefore, even when the battery is crushed, much Joule's heat is not generated, thereby enabling the prevention of an abrupt increase in battery temperatures.

What is claimed:

1. A negative electrode for a lithium secondary battery, the electrode comprising a particulate carbon material enabling the absorption and release of lithium ions and a binder;

in which:
   the particulate carbon material is artificial graphite;
   the particulate carbon material has a volume resistivity not exceeding $5.0 \times 10^{31\ 3}$ ohm·cm; and
   the filling density of the particulate carbon material ranges from 1.2 to 1.40 g/cc.

2. The negative electrode of claim 1 wherein the artificial graphite has an average particle size of 15 to 25 μm.

3. The negative electrode of claim 1 wherein the particulate carbon material has a filling density of 1.4 g/cc.

4. A lithium ion secondary battery comprising:
   (a) a positive electrode comprising a lithium-containing transition metal composite oxide; and
   (b) a negative electrode comprising a particulate carbon material enabling the absorption and release of lithium ions, and a binder;

in which:

the particulate carbon material is artificial graphite;

the particulate carbon material has a volume resistivity not exceeding 9 $5.0 \times 10^{31}$ $^3$ ohm·cm; and the filling density of the particulate carbon material ranges from 1.2 to 1.40 g/cc.

5. The lithium ion secondary battery of claim 4 additionally comprising a nonaqueous electrolyte.

6. The lithium ion secondary battery of claim 5 wherein the transition metal oxide is selected from the group consisting of lithium manganese double oxides, lithium-containing nickel oxides, and lithium-containing cobalt oxides.

7. The lithium ion secondary battery of claim 6 wherein the nonaqueous electrolyte comprises a lithium salt selected from the group consisting of lithium perchlorate, lithium fluoroborate, lithium arsenic hexafluoride, lithium trifluorosulfonate, bis(trifluoromethyl)sulfonylimido lithium, and lithium hexafluorophosphate.

8. The lithium ion secondary battery of claim 7 wherein the transition metal oxide is lithium cobalt oxide.

9. The lithium ion secondary battery of claim 8 wherein the artificial graphite has an average particle size of 15 to 25 $\mu$m.

10. The lithium ion secondary battery of claim 5 wherein the artificial graphite has an average particle size of 15 to 25 $\mu$m.

11. The lithium ion secondary battery of claim 4 wherein the particulate carbon material has a filling density of 1.4 g/cc.

12. The lithium ion secondary battery of claim 4 wherein the artificial graphite has an average particle size of 15 to 25 $\mu$m.

* * * * *

UNITED STATES PATENT AND TRADEMARK OFFICE
CERTIFICATE OF CORRECTION

PATENT NO.     : 6,627,352 B1
DATED          : September 30, 2003
INVENTOR(S)    : Okochi et al.

It is certified that error appears in the above-identified patent and that said Letters Patent is hereby corrected as shown below:

Column 6,
Line 55, "$5.0 \times 10^{313}$" should read -- $5.0 \times 10^{-3}$ --.

Column 7,
Line 4, "9 $5.0 \times 10^{313}$" should read -- $5.0 \times 10^{-3}$ --.

Signed and Sealed this

Sixth Day of April, 2004

JON W. DUDAS
*Acting Director of the United States Patent and Trademark Office*